United States Patent [19]
Martinez

[11] Patent Number: 5,784,438
[45] Date of Patent: Jul. 21, 1998

[54] AUTOMATIC CALLBACK SYSTEM AND METHOD

[75] Inventor: John C. Martinez, Freehold, N.J.

[73] Assignee: AT&T Corp, Middletown, N.J.

[21] Appl. No.: 831,656

[22] Filed: Apr. 9, 1997

Related U.S. Application Data

[63] Continuation of Ser. No. 577,891, Dec. 22, 1995, abandoned.

[51] Int. Cl.[6] .................................................. H04M 1/64
[52] U.S. Cl. ..................... 379/89; 379/209; 379/210; 379/230
[58] Field of Search .................... 379/67, 88, 89, 379/201, 207, 209, 216, 265, 210, 211, 212, 230

[56] References Cited

U.S. PATENT DOCUMENTS

| | | | |
|---|---|---|---|
| 4,166,929 | 9/1979 | Sheinbein | 379/67 |
| 4,930,152 | 5/1990 | Miller | 379/214 |
| 5,155,761 | 10/1992 | Hammond | 379/214 |
| 5,181,236 | 1/1993 | LaVallee et al. | 379/216 |
| 5,425,091 | 6/1995 | Josephs | 379/209 |
| 5,436,967 | 7/1995 | Hanson | 379/216 |
| 5,533,100 | 7/1996 | Bass et al. | 379/209 |
| 5,546,442 | 8/1996 | Foladare et al. | 379/210 |
| 5,661,790 | 8/1997 | Hsu | 379/209 |
| 5,692,033 | 11/1997 | Farris | 379/207 |

*Primary Examiner*—Fan S. Tsang
*Attorney, Agent, or Firm*—Thomas A. Restiano

[57] ABSTRACT

A system and method are disclosed for providing an automatic call-back when a calling party number encounters a ring-no-answer condition upon calling a called party number. An exemplary system includes: (1) a switching network having switches for routing telephone calls; (2) a signaling network coupling switches in the switching network to one another for routing a calling party number and a called party number associated with a telephone call; and (3) a platform coupled to the switching network. The platform stores a calling party number and a called party number received from the switching network corresponding to a telephone call in which the calling party number encountered a ring-no-answer condition and requested an automatic call-back. A processor in the platform detects a subsequent telephone call involving the called party number and, at the conclusion of the subsequent telephone call, initiates the automatic call-back to the calling party number. Upon completing the automatic call-back to the calling party number, the platform transmits a pre-recorded announcement to the calling party number via the switching network indicating that the platform will attempt to complete a telephone call to the called party number in satisfaction of the calling party number's outstanding automatic call-back request. Upon completing the telephone call to the called party number, the platform merges the telephone call to the calling party number with that to the called party number.

21 Claims, 4 Drawing Sheets

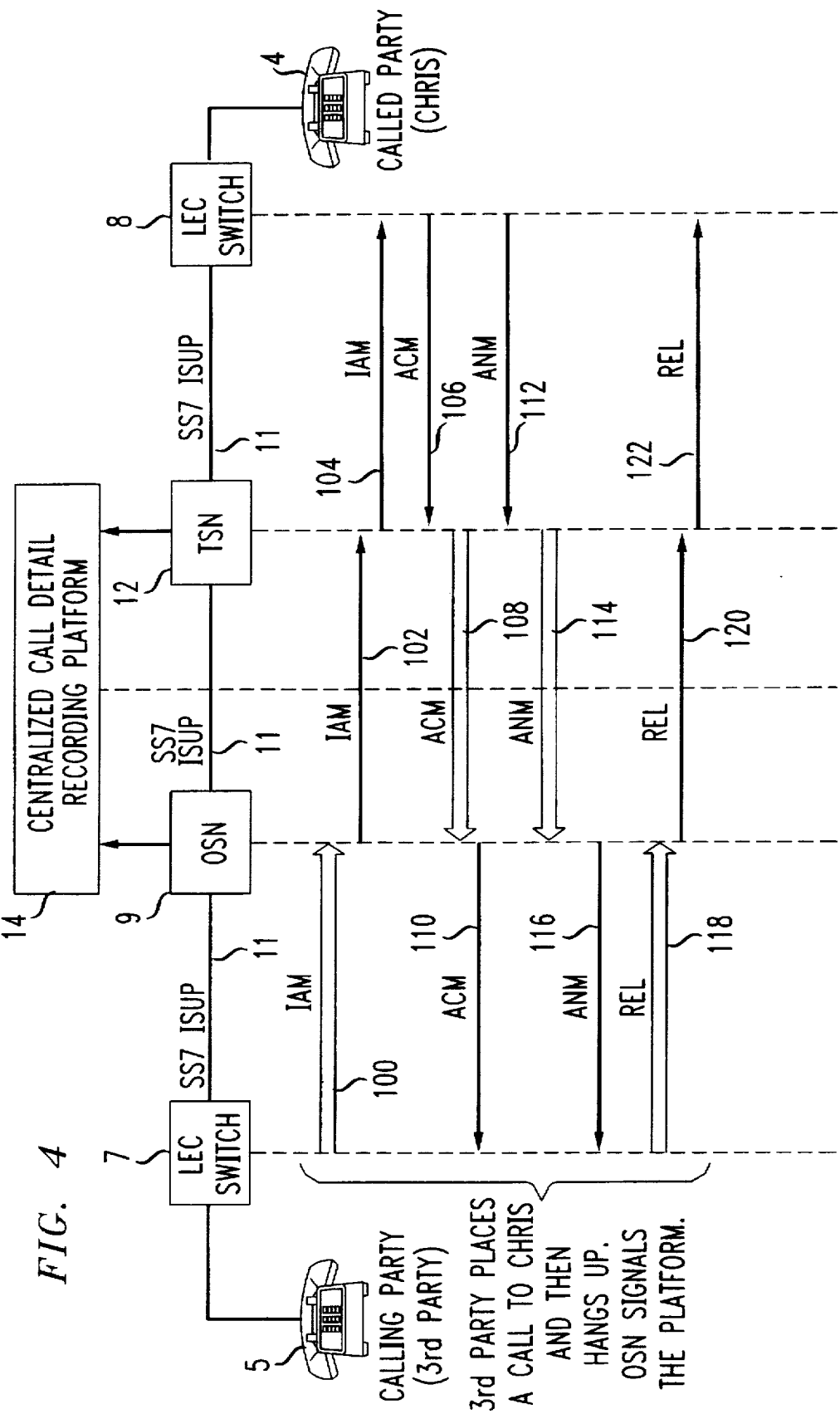

AUTOMATIC CALLBACK SYSTEM AND METHOD

This is a continuation of application Ser. No. 08/577.891, filed on Dec. 22, 1995, now abandoned.

TECHNICAL FIELD

This invention relates generally to communications switching systems and, more particularly, to a system and method for providing an automatic call-back.

BACKGROUND

Several telephone companies and some customer service equipment currently provide an automatic call-back service that allows a calling party to receive an automatic call-back when the calling party dials a called party number and receives a busy signal or a ring-no-answer signal. The various ways in which these services are provided are discussed below:

An automatic call-back for a busy condition is often accomplished by having the network redial the called party number at regular intervals for a predetermined period of time (otherwise known as "repeat dialing") until the network finds that the called party number is on-hook. Once an on-hook condition is sensed, the network dials the calling party number and announces that it is about to place a call to the called party number in satisfaction of the calling party's outstanding call back request. For example, the network may repeat dial the called party number every ten minutes for a period of up to one hour. However, often the attempts at sensing an on-hook condition are hit or miss; the called party number may be on-hook during the interval between call attempts and, busy at the time of each call attempt. Although increasing the incidence of the call attempts and the period over which such attempts are made may increase the likelihood of a successful call completion, a well known disadvantage to doing such is the impact that repeated unsuccessful call attempts have on the network—namely, increased congestion and reduced traffic-handling capacity.

An example of an automatic call-back service for ring-no-answer that also uses repeat dialing is "International Call Complete." The use of repeat dialing in the ring-no-answer context suffers from serious disadvantages in addition to those mentioned above. For example, unlike in the case of repeat dialing for busy, the network would not be attempting to merely sense an on-hook condition, but rather, would be dialing the called party number in the hope that the called party will answer the call; thus the network is not given the opportunity, as in the case of repeat dialing for busy, to dial the calling party number to confirm that the calling party is available and, still wishes to complete the call. Upon answering the call, the called party is asked whether he would be receptive to a call placed to the party who originally called him. Unfortunately, there is no guarantee that the calling party will still be available to take the call. Therefore, the repeat dialing process may have to continue (e.g., every ten minutes for up to one hour), even at the risk of offending the called party, who may have to repeatedly answer the telephone only to find that the calling party is still unavailable to complete the call. In addition, the widespread use of answering machines makes repeat dialing for a ring-no-answer condition, impractical.

A second call-back service for busy is currently being offered as one of the 5ESS Local Area Signaling Services (LASS) features. This service can provide an automatic call-back when a calling party encounters a busy signal and can be provided across a network of switches which use SS7 signaling between them for out-of-band call control. Once a calling party invokes this feature, the terminating switch "camps" on the called party's line until the called party goes on-hook. When an on-hook condition is sensed, the terminating switch signals the originating switch to place a call to the calling party. If the calling party answers the phone, a call is placed to the called party and the two calls are merged. However, neither the 5ESS LASS automatic call-back feature nor any other 5ESS LASS feature provides an automatic call-back when a calling party encounters a ring-no-answer condition.

SUMMARY OF INVENTION

The above-identified problems are solved and a technical advance is achieved in the art by providing an automatic call-back system and method for a ring-no-answer condition without having to resort to network executed repeat dialing of the called party number.

An exemplary system for providing an automatic call-back when a caller encounters a ring-no-answer condition, includes: (1) a switching network having switches for routing telephone calls; (2) a signaling network coupling switches in the switching network to one another for routing a calling party number and a called party number associated with a telephone call; and (3) a platform coupled to the switching network. The platform stores a calling party number and a called party number received from the switching network corresponding to a telephone call in which the calling party number encountered a ring-no-answer condition and requested an automatic call-back. A processor in the platform detects a subsequent telephone call involving the called party number and, at the conclusion of the subsequent telephone call, initiates the automatic call-back to the calling party number. Upon completing the automatic call-back to the calling party number, the platform transmits a pre-recorded announcement to the calling party number via the switching network indicating that the platform will attempt to complete a telephone call to the called party number in satisfaction of the calling party number's outstanding automatic call-back request. Because the called party number has just gone on-hook following the aforesaid subsequent telephone call, there is a high probability that the called party will answer the call. Upon completing the telephone call to the called party number, the platform merges the telephone call to the calling party number with that to the called party number.

Other and further aspects of the present invention will become apparent during the course of the following description and by reference to the attached drawings.

BRIEF DESCRIPTION OF THE DRAWINGS

FIG. 4 depicts a modification to the call flow shown in FIG. 3.

DETAILED DESCRIPTION

Figure 1:
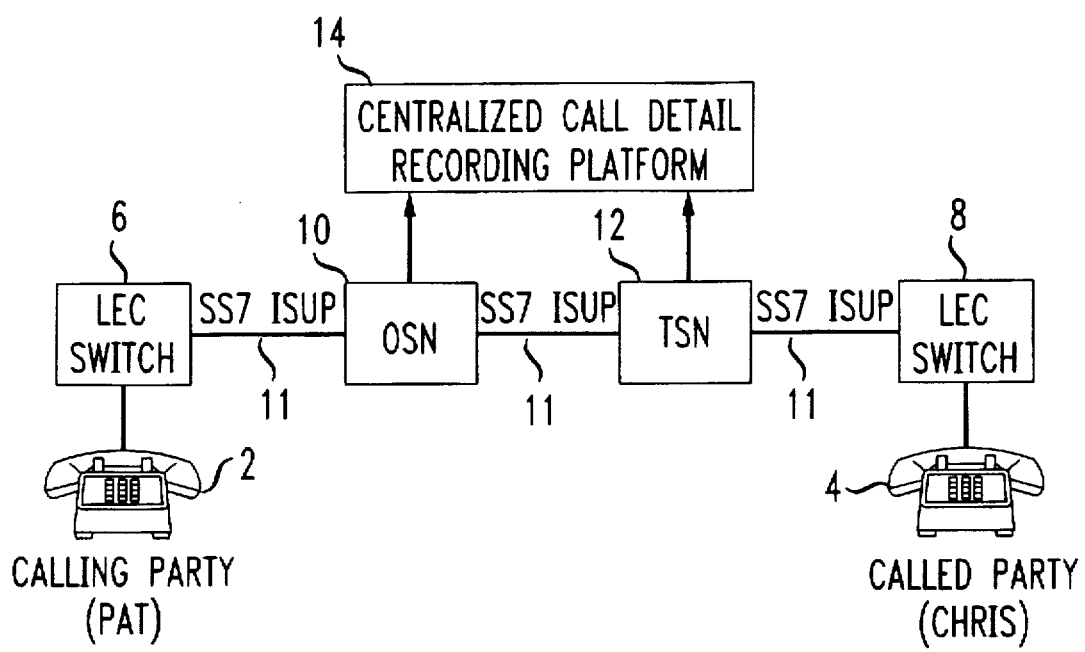
FIG. 1 is a block diagram illustrating one embodiment of the present invention.

Referring now to the drawings wherein like reference numbers refer to like parts, FIG. 1 illustrates one embodiment of the present invention. As shown in FIG. 1, a calling party 2 and a called party 4 are coupled to an intermediary switching network via respective local exchange carrier (LEC) end offices (6, 8). The switching network comprises an originating switch node (OSN) 10 and a terminating switch node (TSN) 12 in communication with a Centralized Call Detail Recording Platform 14 (hereinafter, "the platform"). End-to-end SS7 connectivity 11 for transmitting out-of-band calling activity between the LECs (6, 8) and the switching network is assumed. Out-of-band calling activity includes call origination information such as the Calling Party Number ("Calling_PN") and/or Automatic Number Identification (ANI). It also includes call destination information such as the Called Party Number ("Called_PN").

The platform 14 is a distributed computer system (comprising a central computer system attached to a processing system located in each network switch) that records calling information and generates billing data. Due to its distributed architecture, the platform 14 provides the capability to record calling information in real time. In a non-distributed environment, calling information would be downloaded to a centralized location much less frequently; typically, once a month. As will become apparent below, real time recording permits a computer system to react within a few seconds of the end of a telephone call. Accordingly, the platform 14 can (1) determine when a called party 4 who was unavailable to answer a telephone call (because, for example, the called party 4 was not home at the time) has completed a telephone call (after returning home) and (2) attempt to connect the called party 4 with a calling party 2 who previously invoked the automatic call-back feature.

Figure 2:
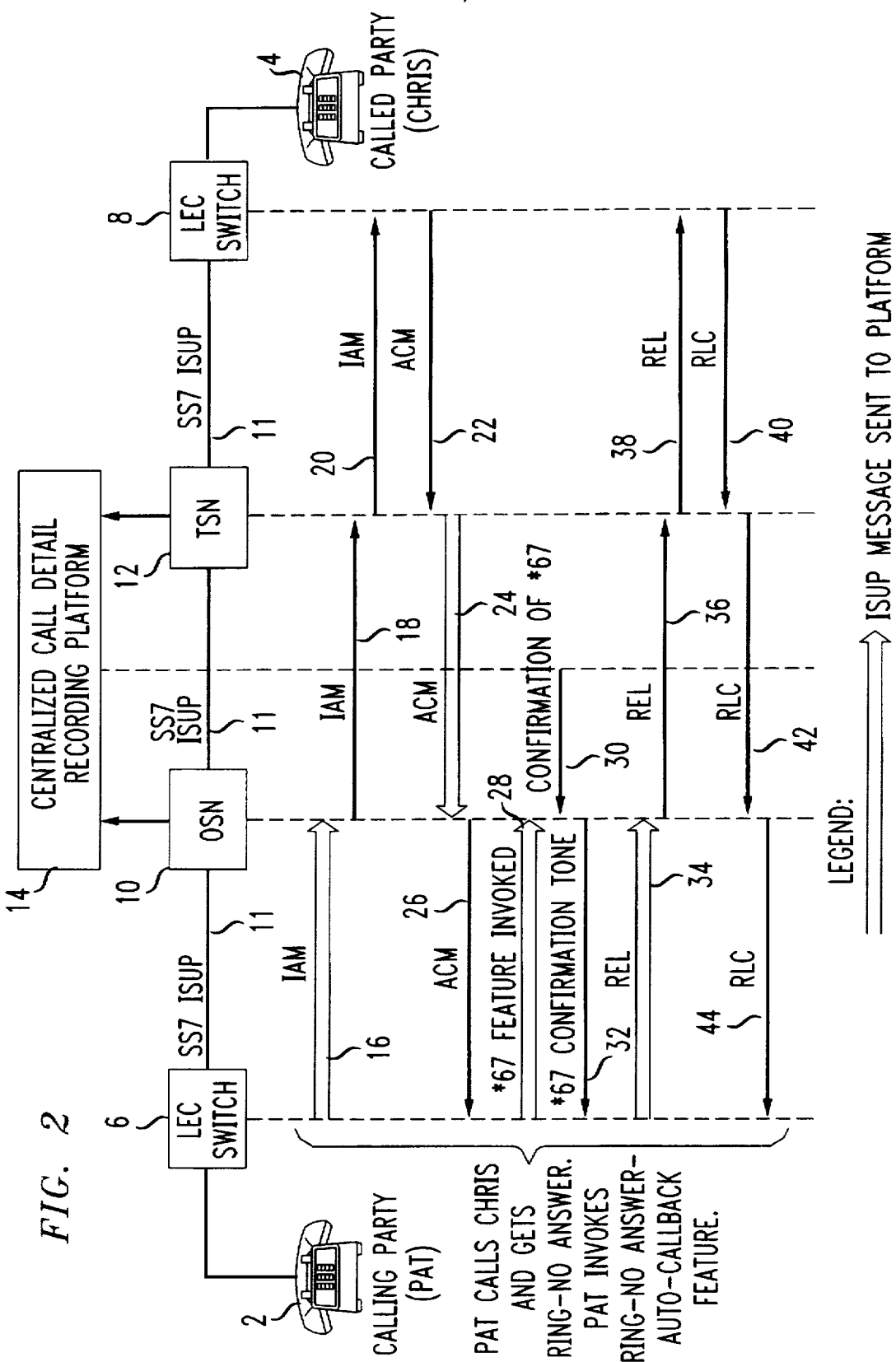
FIG. 2 depicts a call flow for the embodiment of FIG. 1 wherein a calling party places a telephone call, receives a ring-no-answer signal, and invokes the automatic call-back feature of the present invention.

FIG. 2 shows a call flow for the embodiment of FIG. 1, wherein a calling party 2 places a call, gets a "ring-no-answer" signal, and invokes the automatic call-back feature of the present invention. The calling party 2 goes off-hook and gets dial-tone. The calling party 2 then dials the telephone number of the party with whom he wishes to communicate. The originating LEC 6 creates an Initial Address Message (IAM), which contains the Calling_PN, the Called_PN, and the ANI. The IAM is forwarded to the terminating LEC 8 via the switching network. (Steps 16, 18, 20). The terminating LEC 8 rings the telephone associated with the Called_PN and, sends an Address Complete Message (ACM) via the switching network to the originating LEC. (Steps 22, 24, 26). Both the IAM and the ACM are also delivered to the platform 14 via the OSN. (Steps 16, 24).

In the event that the calling party 2 encounters a ring-no-answer signal (because, for example, the called party 4 is away from his or her telephone), the calling party 2 enters the feature code (for example, *67) from the touch-tone keypad of his or her telephone to activate the automatic call-back feature of the present invention. The originating LEC 6 sends the *67 message to the OSN 10, which, in turn, sends it to the platform 14. (Step 28). The platform 14 stores the previously delivered IAM as a Calling_PN and Called_PN pair. The platform 14 then sends confirmation of the invoked feature to the OSN 10 and, an audible confirmation tone is delivered to the calling party 2. (Steps 30, 32). The calling party 2 then hangs up and, the usual release and release clear messages are exchanged between the LECs (6, 8) via the switching network. (Steps 34-44). The platform 14 will then monitor calling activity for the Called_PN by comparing the calling party number of all calls released at the TSN 12 against the Called_PN portion of the Calling_PN and Called_PN pair previously stored in the platform 14.

Figure 3:
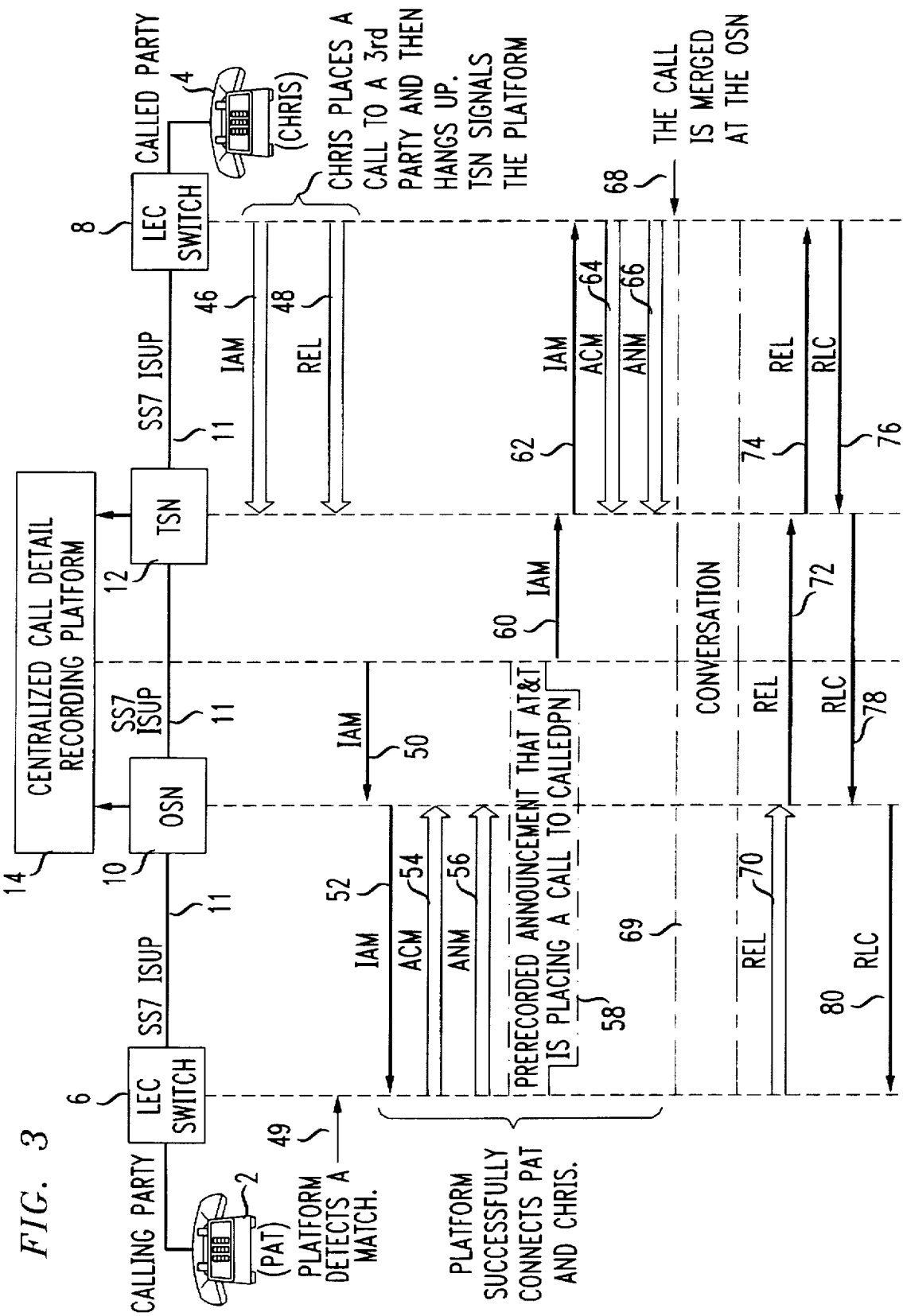
FIG. 3 depicts a call flow for the embodiment of FIG. 1 wherein the automatic call-back feature of the present invention is implemented.

FIG. 3 continues the call flow for the embodiment of FIG. 1. Referring to FIG. 3, the previously called party 4 goes off-hook and places a telephone call to a third party. The TSN 12 sends the calling party number associated with the foregoing call to the platform 14 as part of the IAM. (Step 46). The called party 4 eventually hangs-up and a release signal is sent to the platform 14. (Step 48). The calling party number and the release signal associated with the foregoing call are transmitted to the platform 14 for both telephone call attempts (calls unanswered by the third-party) and successfully completed telephone calls (those answered by the third-party); both are indications that the called party 4 is available for a telephone call placed in satisfaction of the calling party's 2 pending call-back request. Note also that the calling party number and the release signal may be transmitted from the TSN 12 to the platform 14 simultaneously rather than separately. In other words, the TSN could wait for receipt of the release signal before transmitting the calling party number to the platform 14. In any event, the platform 14 compares the calling party number associated with the release of the foregoing call with the Called-PN portion of the previously stored Calling_PN and Called_PN pair to detect a match. (Step 49).

As shown in FIG. 4, the previously called party 4 may alternatively go off-hook in response to a telephone call from a third party 5. (Steps 100-116). In that instance, the third-party's OSN 9 would send the called party number associated with the call to the platform 14 as part of the IAM. (Step 100). The third party 5 would eventually hang-up and a release signal would be sent to the platform 14. (Step 118). Note that under this scenario, the called party number and the release signal associated with the foregoing call are only transmitted to the platform 14 for successfully completed telephone calls (those answered by the called party 4). Note also that the calling party number and the release signal may be transmitted to the platform 14 simultaneously rather than separately. The platform 14 would then compare the called party number associated with the release of the foregoing call with the Called-PN portion of the previously stored Calling_PN and Called_PN pair to detect a match. (FIG. 3, Step 49).

Returning attention to FIG. 3, upon detecting a match, the platform 14 retrieves the previously stored Calling_PN, generates an IAM, and places a call to the Calling_PN via the OSN 10 and the appropriate LEC 6; the platform 14 receives the usual Address Complete Message (ACM). (Steps 50, 52, 54). When the calling party 2 answers the telephone, the platform 14 receives an Answer Message (ANM) and, in response to the ANM, plays a pre-recorded announcement indicating that the network is placing a ring-no-answer automatic call-back telephone call to the Called_PN. (Steps 56, 58). If the calling party 2 wishes to complete the call, he or she will be instructed to dial "1". If the calling party 2 decides not to complete the call, he or she will be instructed to dial "2". In the event that the calling party 2 dials "1", the platform 14 retrieves the previously stored Called_PN, generates an IAM, and places a call to the Called_PN via the TSN 12 and the appropriate LEC 8. (Steps 60, 62). Once again, the platform 14 receives the usual Address Complete Message (ACM). (Step 64). When the called party 4 answers the telephone, the platform 14 receives the usual ANM. (Step 66). At that instant, the platform 14 merges the two calls (one to the Calling_PN and the other to the Called_PN) at the OSN 10, and the call completes as a normal Plain Old Telephone Service (POTS) call. (Steps 69-80). The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, while this disclosure has focused upon providing an automatic call-back for a calling party who encounters a ring-no-answer condition in an inter-LATA switching network, the foregoing disclosure is sufficient to enable one of ordinary skill in the art to readily apply the present invention to providing an automatic call-back for ring-no-answer on an intra-LATA basis.

I claim:

1. A system for providing an automatic call-back to a calling party who encounters a ring-no-answer condition upon calling a called party number, comprising:

a switching network having switches for routing telephone calls;

a signaling network coupling said switches in said switching network to one another for routing a calling party number and a called party number associated with a telephone call; and a platform coupled to said switching network, said platform storing a calling party number and a called party number received from said switching network and corresponding to a telephone call in which said calling party encountered a ring-no-answer condition and requested an automatic call-back, and said platform having a processor adapted to provide said automatic call-back to said calling party number in response to detection of a signal indicating a subsequent telephone call involving said called party number.

2. The system of claim 1, whereupon completing said automatic call-back to said calling party, said platform transmits a pre-recorded announcement to said calling party via said switching network indicating that said platform will attempt to complete a telephone call to said called party number in satisfaction of an automatic call-back request of said calling party.

3. The system of claim 2, whereupon completing said telephone call to said called party number, said platform merges said telephone call to said calling party number with said telephone call to said called party number.

4. A system for providing an automatic call-back to a calling party who encounters a ring-no-answer condition upon calling a called party number, comprising:

a switching network having switches for routing telephone calls;

said switching network comprising a first originating switch node coupled to a first originating telephone call location corresponding to a calling party number and, a terminating switch node coupled to a destination telephone call location corresponding to a called party number;

a signaling network coupling switches in said switching network to one another for routing origination information and destination information associated with a telephone call; and a platform coupled to said switching network, said platform storing said calling party number and said called party number received from said first originating switch node and corresponding to a telephone call in which said calling party encountered a ring-no-answer condition and requested an automatic call-back, and said platform having a processor adapted to provide said automatic call-back to said calling party number in response to detection of a signal indicating a subsequent telephone call involving said called party number.

5. The system of claim 4, wherein said processor receives origination information of subsequent telephone call attempts and successful telephone calls originated at said terminating switch node and, compares said origination information of said telephone call attempts and said successful telephone calls against said called party number to detect whether said called party has initiated a subsequent telephone call attempt or successful telephone call to a third-party number.

6. The system of claim 5, whereupon completing said automatic call-back to said calling party number, said platform transmits a pre-recorded announcement to said calling party via said switching network indicating that said platform will attempt to complete a telephone call to said called party number in satisfaction of an automatic call-back request of said calling party.

7. The system of claim 6, whereupon completing said telephone call to said called party number, said platform merges said telephone call to said calling party number with said telephone call to said called party number.

8. The system of claim 7, wherein said telephone calls are merged at said first originating switch node.

9. The system of claim 4, further comprising a second originating switch node, and wherein said processor receives destination information of subsequent successful telephone calls originated at said second originating switch node and compares said destination information of said successful telephone calls against said called party number to detect whether a third-party has initiated a subsequent successful telephone call to said called party number.

10. The system of claim 9, wherein said first originating switch node and said second originating switch node are the same originating switch node.

11. The system of claim 9, whereupon completing said automatic call-back to said calling party number, said platform transmits a pre-recorded announcement to said calling party via said switching network indicating that said platform will attempt to complete a telephone call to said called party number in satisfaction of an automatic call-back request of said calling party.

12. The system of claim 11, whereupon completing said telephone call to said called party number, said platform merges said telephone call to said calling party number with said telephone call to said called party number.

13. The system of claim 12, wherein said telephone calls are merged at said first originating switch node.

14. A method for providing an automatic call-back to a calling party who encountered a ring-no-answer condition upon calling a called party number to initiate a telephone call, comprising the steps of:

determining that a ring-no-answer condition exists based on a telephone call placed by a calling party to said called party number;

detecting a signal indicating a subsequent telephone call involving said called party number; and providing an automatic call-back to said calling party number in response to detection of said signal.

15. The method of claim 14, wherein said detecting step comprises comparing origination information of subsequent telephone call attempts and successful telephone calls originated at a billing switch associated with said called party number against said called party number to determine whether said called party has initiated a subsequent telephone call attempt or successful telephone call to a third-party number.

16. The method of claim 15, further including the step of transmitting a pre-recorded announcement to said calling party indicating that an attempt will be made to complete a telephone call to said called party number in satisfaction of said calling party's automatic call-back request.

17. The system of claim 16, further including the step of merging said telephone call to said calling party number with said telephone call to said called party number.

18. The method of claim 14, wherein said detecting step comprises comparing destination information of subsequent successful telephone calls originated at a billing switch associated with a third-party number against said called party number to determine whether a third-party has initiated a subsequent successful telephone call to said called party number.

19. The method of claim 18, further including the step of transmitting a pre-recorded announcement to said calling party indicating that an attempt will be made to complete a telephone call to said called party number in satisfaction of said calling party's automatic call-back request.

20. The method of claim 19, further including the step of merging said telephone call to said calling party number with said telephone call to said called party number.

21. A system for providing an automatic call-back to a calling party who encounters a ring-no-answer condition upon calling a called party number, the system for use in a network of the type which includes a switching network having switches for routing telephone calls and a signaling network coupled to said switches in said switching network for routing a calling party number and a called party number associated with a telephone call, the system comprising:

a storage medium, coupled to said switching network, for storing a calling party number and a called party number received from said switching network and corresponding to a telephone call in which said calling party encountered a ring-no-answer condition and requested an automatic call-back; and a processor, coupled to said storage medium, adapted to detect a signal indicating a subsequent telephone call involving said called party number and, to provide said automatic call-back to said calling party number in response to detection of said signal.

* * * * *